(12) United States Patent
Hoshi

(10) Patent No.: US 9,780,397 B2
(45) Date of Patent: Oct. 3, 2017

(54) FUEL CELL SYSTEM

(71) Applicant: NISSAN MOTOR CO., LTD., Yokohama-shi, Kanagawa (JP)

(72) Inventor: Kiyoshi Hoshi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/026,426

(22) PCT Filed: Sep. 10, 2014

(86) PCT No.: PCT/JP2014/073992
§ 371 (c)(1),
(2) Date: Mar. 31, 2016

(87) PCT Pub. No.: WO2015/049964
PCT Pub. Date: Apr. 9, 2015

(65) Prior Publication Data
US 2016/0240872 A1 Aug. 18, 2016

(30) Foreign Application Priority Data

Oct. 1, 2013 (JP) .................................. 2013-206513

(51) Int. Cl.
*B60L 11/18* (2006.01)
*H01M 8/04225* (2016.01)
(Continued)

(52) U.S. Cl.
CPC ..... *H01M 8/04225* (2016.02); *B60L 11/1885* (2013.01); *B60L 11/1892* (2013.01);
(Continued)

(58) Field of Classification Search
CPC .............................................. H01M 8/04225
See application file for complete search history.

(56) References Cited

U.S. PATENT DOCUMENTS

2005/0053809 A1* 3/2005 Hayashi ............ H01M 8/04223
429/415
2006/0263653 A1  11/2006 Sinha et al.
(Continued)

FOREIGN PATENT DOCUMENTS

JP    2000-357526 A    12/2000
JP    2002-134150 A    5/2002
(Continued)

*Primary Examiner* — Sarah A Slifka
*Assistant Examiner* — Brian Ohara
(74) *Attorney, Agent, or Firm* — Foley & Lardner LLP

(57) ABSTRACT

There is provided a fuel cell system that generates an electric power by supplying an anode gas and a cathode gas to a fuel cell. The fuel cell system includes: auxiliary machines and a drive motor driven by the generated electric power of the fuel cell; a pressure control unit configured to control a pressure of the cathode gas to be supplied to the fuel cell at a normal target pressure, the normal target pressure being used for ensuring an oxygen partial pressure within the fuel cell in accordance with the generated electric power of the fuel cell; and a warming-up pressure control unit configured to control the pressure of the cathode gas to be supplied to the fuel cell to become a predetermined warm-up acceleration target pressure during warm-up of the fuel cell, the predetermined warm-up acceleration target pressure being higher than the normal target pressure. In a case where there is a request to drive the drive motor during the warm-up of the fuel cell, the warming-up pressure control unit controls the pressure of the cathode gas to be supplied to the fuel cell to a warm-up target pressure between the normal target pressure and the warm-up acceleration target pressure.

8 Claims, 6 Drawing Sheets

(51) Int. Cl.
  *H01M 8/04302* (2016.01)
  *H01M 8/04089* (2016.01)
  *H01M 8/04223* (2016.01)
  *H01M 8/0438* (2016.01)
  *H01M 8/04492* (2016.01)
  *H01M 8/04537* (2016.01)
  *H01M 8/1007* (2016.01)
  *H01M 8/1004* (2016.01)
  *H01M 8/1018* (2016.01)
  *H01M 8/04746* (2016.01)

(52) U.S. Cl.
  CPC ... *H01M 8/04104* (2013.01); *H01M 8/04268* (2013.01); *H01M 8/04302* (2016.02); *H01M 8/04395* (2013.01); *H01M 8/04529* (2013.01); *H01M 8/04604* (2013.01); *H01M 8/04619* (2013.01); *H01M 8/04753* (2013.01); *H01M 8/04589* (2013.01); *H01M 8/1004* (2013.01); *H01M 8/1007* (2016.02); *H01M 2008/1095* (2013.01); *H01M 2250/20* (2013.01); *Y02T 90/32* (2013.01)

(56) References Cited

U.S. PATENT DOCUMENTS

| | | |
|---|---|---|
| 2007/0166577 A1 | 7/2007 | Inai et al. |
| 2009/0305099 A1* | 12/2009 | Chowdhury ...... H01M 8/04037 429/413 |
| 2011/0086285 A1* | 4/2011 | Chikugo ........... H01M 8/04089 429/429 |
| 2014/0205923 A1 | 7/2014 | Matsumoto |
| 2015/0004506 A1 | 1/2015 | Tomita et al. |

FOREIGN PATENT DOCUMENTS

| | | |
|---|---|---|
| JP | 2005-044795 A | 2/2005 |
| JP | 2005-235584 A | 9/2005 |
| JP | 2006-324242 A | 11/2006 |
| JP | 2007-188830 A | 7/2007 |
| WO | WO 2013/027634 A1 | 2/2013 |
| WO | WO 2013/105590 A1 | 7/2013 |

* cited by examiner

FUEL CELL SYSTEM

TECHNICAL FIELD

The present invention relates to a fuel cell system.

BACKGROUND ART

As a conventional fuel cell system, there is one in which an IV characteristic (a current and voltage characteristic) of a fuel cell is estimated on the basis of an output voltage detected while changing an output current of the fuel cell (see JP2000-357526A).

SUMMARY OF THE INVENTION

In a fuel cell system under development now, during a normal operation after warm-up of a fuel cell, a pressure of a cathode gas to be supplied to the fuel cell is set up on the basis of an electric power required to cause a vehicle to travel so that an oxygen partial pressure necessary for generating the required electric power can be ensured, and a cathode compressor is driven in accordance with the pressure of the cathode gas thus set up.

On the other hand, during the warm-up of the fuel cell, a pressure of a cathode side within the fuel cell is set up to a pressure for warming-up, which is higher than that at the normal operation. The cathode compressor that is one of auxiliary machines is controlled so that electricity consumption thereof becomes larger as much as possible. This causes a generated electric power of the fuel cell to be increased, thereby accelerating the warm-up of the fuel cell.

Further, the IV characteristic of the fuel cell deteriorates in the early period of the warm-up, and there is a possibility that an electric power necessary for traveling of the vehicle cannot be supplied. For that reason, the IV characteristic during the warm-up is estimated, and traveling permission for the vehicle is to be outputted at the time when the estimated IV characteristic becomes an IV characteristic required for traveling of the vehicle.

Here, the IV characteristic deteriorates during the warm-up compared with during the normal operation after the warm-up. For that reason, the generated electric power of the fuel cell is restricted compared with that during the normal operation. For that reason, in a case where the traveling permission is outputted during the warm-up and an acceleration request by a driver is generated, a drive motor has to be driven by the generated electric power thus restricted.

Therefore, it was found that the following problem occurs in a case where a required electric power is to be supplied to the drive motor in order to ensure operability thereof in the generated electric power thus restricted, there is a possibility that the electricity consumption of the cathode compressor has to be lowered. At this time, in a case where it makes an attempt to reduce (or lower) the electricity consumption of the cathode compressor by causing the pressure of the cathode gas to be supplied to the fuel cell to drop from a high pressure used for the warming-up to the pressure set up during the normal operation as described above.

Namely, the following problem was found. In a case where a cathode-side pressure within the fuel cell is caused to drop from the pressure for the warming-up to the pressure set up during the normal operation during the warm-up after the traveling permission was outputted, the IV characteristic of the fuel cell deteriorates due to dropping of the oxygen partial pressure at the cathode side. As a result, there is a fear that a current IV characteristic deteriorates compared with the IV characteristic when the traveling permission was outputted and this poses an obstacle to traveling of the vehicle.

The present invention was made by focusing such problems, and it is an object of the present invention to provide a fuel cell system capable of suppressing deterioration of an IV characteristic in a case where traveling permission is outputted during a warm-up operation and there is thus an acceleration request.

According to one aspect of the present invention, there is provided a fuel cell system in which an electric power is generated by supplying an anode gas and a cathode gas to a fuel cell. The fuel cell system according to the one aspect includes: auxiliary machines and a drive motor driven by the generated electric power of the fuel cell; a pressure control unit configured to control a pressure of the cathode gas to be supplied to the fuel cell at a normal target pressure, the normal target pressure being used for ensuring an oxygen partial pressure within the fuel cell in accordance with the generated electric power of the fuel cell; and a warming-up pressure control unit configured to control the pressure of the cathode gas to be supplied to the fuel cell to become a predetermined warm-up acceleration target pressure during warm-up of the fuel cell, the predetermined warm-up acceleration target pressure being higher than the normal target pressure, in a case where there is a request to drive the drive motor during the warm-up of the fuel cell, the warming-up pressure control unit controls the pressure of the cathode gas to be supplied to the fuel cell to a warm-up target pressure between the normal target pressure and the warm-up acceleration target pressure.

According to this aspect, when there is a request to drive the drive motor during the warm-up of the fuel cell, the pressure of the cathode gas to be supplied to the fuel cell is controlled to the warm-up target pressure between the normal target pressure at the normal operation and the warm-up acceleration target pressure for accelerating the warm-up. This makes it possible to suppress the pressure from dropping when there is a request to drive the drive motor during the warm-up of the fuel cell. Therefore, it is possible to suppress an IV characteristic from deteriorating.

DESCRIPTION OF THE EMBODIMENTS

Hereinafter, an embodiment of the present invention will be described with reference to the accompanying drawings and the like.

In a fuel cell, an electrolyte membrane is sandwiched between an anode electrode (fuel electrode) and a cathode electrode (oxidant electrode), and electric power is generated by supplying an anode gas (fuel gas) containing hydrogen to the anode electrode and supplying a cathode gas (oxidant gas) containing oxygen to the cathode electrode. Electrode reactions that proceed on both the anode electrode and the cathode electrode are as follows.

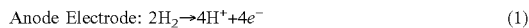

Anode Electrode: $2H_2 \rightarrow 4H^+ + 4e^-$ (1)

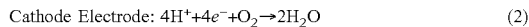

Cathode Electrode: $4H^+ + 4e^- + O_2 \rightarrow 2H_2O$ (2)

The fuel cell generates an electromotive force of about one volt by means of these electrode reactions (1) and (2).

In a case where a fuel cell is utilized as a power source for a vehicle, the electric power to be required becomes greater. For this reason, the fuel cells are used as a fuel cell stack in which several hundreds of the fuel cells are laminated. Then, by constituting a fuel cell system for supplying the anode gas and the cathode gas to the fuel cell stack, an electric power for driving the vehicle is taken out.

Figure 1:
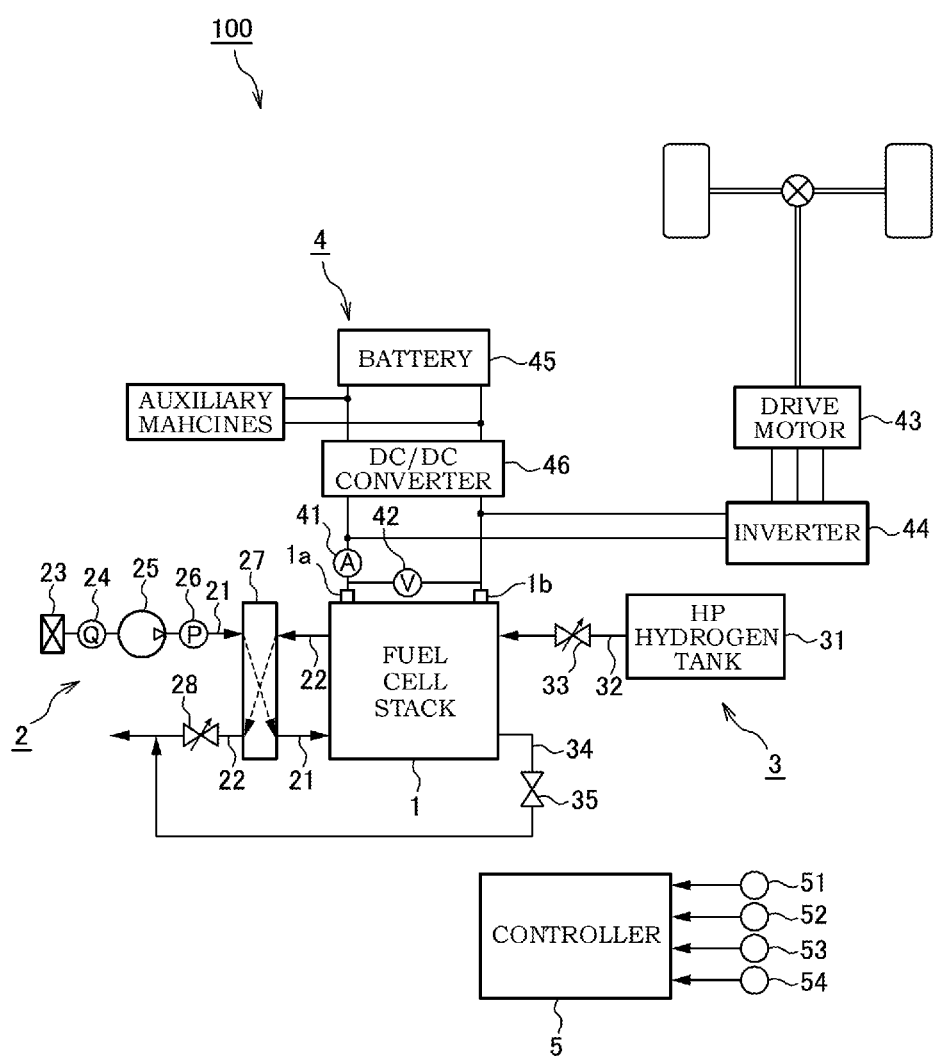
FIG. 1 is a schematic view of a fuel cell system according to one embodiment of the present invention.

FIG. 1 is a schematic view of a fuel cell system 100 according to one embodiment of the present invention.

The fuel cell system 100 includes a fuel cell stack 1, a cathode gas supply/discharge device 2, an anode gas supply/discharge device 3, an electric power system 4, and a controller 5.

The fuel cell stack 1 is constructed by stacking a plurality of fuel cells, and receives the supply of the anode gas and the cathode gas to generate an electric power necessary for driving of the vehicle. The fuel cell stack 1 includes an anode electrode-side output terminal 1a and a cathode electrode-side output terminal 1b as terminals for extracting an electric power.

The cathode gas supply/discharge device 2 includes a cathode gas supply passage 21, a cathode gas discharge passage 22, a filter 23, an air flow sensor 24, a cathode compressor 25, a cathode pressure sensor 26, a water recovery device (Water Recovery Device: hereinafter, referred to as a "WRD") 27, and a cathode pressure regulating valve 28. The cathode gas supply/discharge device 2 supplies the cathode gas to the fuel cell stack 1, and discharges a cathode off-gas discharged from the fuel cell stack 1 to the outside air.

The cathode gas supply passage 21 is a passage in which the cathode gas to be supplied to the fuel cell stack 1 flows. One end of the cathode gas supply passage 21 is connected to the filter 23, and the other end thereof is connected to a cathode gas inlet port of the fuel cell stack 1.

The cathode gas discharge passage 22 is a passage in which the cathode off-gas discharged from the fuel cell stack 1 flows. One end of the cathode gas discharge passage 22 is connected to a cathode gas outlet port of the fuel cell stack 1, and the other end thereof becomes an open end. The cathode off-gas is a mixture gas of the cathode gas and steam generated by an electrode reaction.

The filter 23 removes foreign matter in the cathode gas to be taken in the cathode gas supply passage 21.

The air flow sensor 24 is provided on the cathode gas supply passage 21 upstream from the cathode compressor 25. The air flow sensor 24 detects a flow rate of the cathode gas that is supplied to the cathode compressor 25 and is then supplied to the fuel cell stack 1 finally.

The cathode compressor 25 is provided on the cathode gas supply passage 21. The cathode compressor 25 takes air (outside air) in the cathode gas supply passage 21 as the cathode gas via the filter 23, and supplies the air to the fuel cell stack 1.

The cathode pressure sensor 26 is provided on the cathode gas supply passage 21 between the cathode compressor 25 and the WRD 27. The cathode pressure sensor 26 detects a pressure of the cathode gas supplied to the fuel cell stack 1 (hereinafter, referred to as a "cathode pressure").

The WRD 27 is connected to each of the cathode gas supply passage 21 and the cathode gas discharge passage 22 to collect moisture in the cathode off-gas flowing in the cathode gas discharge passage 22. The WRD 27 humidifies the cathode gas flowing in the cathode gas supply passage 21 using the collected moisture.

The cathode regulating valve 28 is provided on the cathode gas discharge passage 22 downward from the WRD 27. Opening and closing of the cathode regulating valve 28 is controlled by the controller 5 to adjust the cathode pressure to be supplied to the fuel cell stack 1. In this regard, in the present embodiment, the cathode pressure is controlled to a desired pressure (a target cathode pressure) by basically adjusting a rotational speed of the cathode compressor 25 and an opening degree of the cathode pressure regulating valve 28.

The anode gas supply/discharge device 3 supplies the anode gas to the fuel cell stack 1, and discharges an anode off-gas discharged from the fuel cell stack 1 to the cathode gas discharge passage 22. The anode gas supply/discharge device 3 includes a high-pressure hydrogen tank 31, an anode gas supply passage 32, an anode pressure regulating valve 33, an anode gas discharge passage 34, and a purge valve 35.

The high-pressure hydrogen tank 31 keeps and stores the anode gas to be supplied to the fuel cell stack 1 in a high-pressure state.

The anode gas supply passage 32 is a passage to supply the anode gas discharged from the high-pressure hydrogen tank 31 to the fuel cell stack 1. One end of the anode gas supply passage 32 is connected to the high-pressure hydrogen tank 31, and the other end thereof is connected to an anode gas inlet port of the fuel cell stack 1.

The anode pressure regulating valve 33 is provided on the anode gas supply passage 32. Opening and closing of the anode pressure regulating valve 33 is controlled by the controller 5 to adjust a pressure of the anode gas to be supplied to the fuel cell stack 1 to a desired pressure.

The anode gas discharge passage 34 is a passage in which the anode off-gas discharged from the fuel cell stack 1 flows. One end of the anode gas discharge passage 34 is connected to an anode gas outlet port of the fuel cell stack 1, and the other end thereof is connected to the cathode gas discharge passage 22.

The anode off-gas discharged to the cathode gas discharge passage 22 via the anode gas discharge passage 34 is mixed with the cathode off-gas in the cathode gas discharge passage 22, and is discharged to the outside of the fuel cell system 100. Excess hydrogen that is not used in the electrode reaction is contained in the anode off-gas. Therefore, by mixing the excess hydrogen with the cathode off-gas and then discharging it to the outside of the fuel cell system 100, a hydrogen concentration in the discharge gas is set to become a predetermined concentration or lower.

The purge valve 35 is provided on the anode gas discharge passage 34. Opening and closing of the purge valve 35 is controlled by the controller 5 to control a flow rate of the anode off-gas to be discharged from the anode gas discharge passage 34 to the cathode gas discharge passage 22.

The electric power system 4 includes a current sensor 41, a voltage sensor 42, a drive motor 43, an inverter 44, a battery 45, and a DC/DC converter 46.

The current sensor 41 detects a current taken out from the fuel cell stack 1 (hereinafter, referred to as an "output current").

The voltage sensor 42 detects an inter-terminal voltage between the anode electrode side output terminal 1a and the cathode electrode side output terminal 1b (hereinafter, referred to as an "output voltage"). In this regard, the fuel cell system may be configured so that a voltage of each one cell of the fuel cells that constitute the fuel cell stack 1 can be detected, or a voltage of every plural cells can be detected.

The drive motor 43 is a three-phase synchronous motor in which permanent magnets are embedded in a rotor and a stator coil is wound around a stator. The drive motor 43 has a function as an electric motor that receives supply of the electric power from the fuel cell stack 1 and the battery 45 to be rotatably driven, and a function as a power generator that generates an electromotive force between both ends of the stator coil at the time of deceleration of the vehicle in which the rotor is caused to rotate by means of an external force.

The inverter 44 is configured by a plurality of semiconductor switches, such as an IGBT (Insulated Gate Bipolar Transistor), for example. Opening and closing of each of the semiconductor switches in the inverter 44 is controlled by the controller 5 to convert a DC electric power to an AC electric power or convert an AC electric power to a DC electric power. When the drive motor 43 is caused to function as an electric motor, the inverter 44 converts a composite DC electric power of the electric power generated by the fuel cell stack 1 and the electric power outputted from the battery 45 into a three-phase AC electric power to supply the three-phase AC electric power to the drive motor 43. On the other hand, when the drive motor 43 is caused to function as a power generator, the inverter 44 converts a regenerative electric power of the drive motor 43 (three-phase AC electric power) into a DC electric power to supply the DC electric power to the battery 45.

An excess value of the generated electric power of the fuel cell stack 1 (the output current×the output voltage) and a regenerative electric power of the traveling motor 43 are charged in the battery 45. The electric power charged in the battery 45 is supplied to the drive motor 43 and auxiliary machines such as the cathode compressor 25 and a cooling water heater (not shown in the drawings) for heating a cooling water if necessary.

The DC/DC converter 46 is a bidirectional voltage converter that raises or drops the output voltage of the fuel cell stack 1. The DC/DC converter 46 controls the output voltage of the fuel cell stack 1, whereby the output current of the fuel cell stack 1 is controlled, and the generated electric power is controlled furthermore.

The controller 5 is configured by a microcomputer that includes a Central Processing Unit (CPU), a Read Only Memory (ROM), a Random Access Memory (RAM) and an input/output interface (I/O interface).

Various kinds of signals for detecting an operation state of the fuel cell system 100 are inputted to the controller 5 in addition to the air flow sensor 24 described above and the like. The signals include signals of: an accelerator stroke sensor 51 for detecting a pressing amount of an accelerator pedal (hereinafter, referred to as an "accelerator operating amount"); a rotational speed sensor 52 for detecting the rotational speed of the cathode compressor 25; a plurality of water temperature sensors 53 for detecting a temperature of a cooling water flowing into the fuel cell stack 1 (hereinafter, referred to as an "inlet water temperature") and a temperature of the cooling water discharged from the fuel cell stack 1 (hereinafter, referred to as an "outlet water temperature"); and an SOC sensor 54 for detecting a charged capacity of the battery 45. In this regard, in the present invention, an average temperature of the inlet water temperature and the outlet water temperature is set up as a temperature of the fuel cell stack 1 (hereinafter, referred to as a "stack temperature").

The controller 5 calculates not only a target generated electric power of the fuel cell stack 1 but also a target output current on the basis of input signals from these various kinds of sensors and operation statuses of the drive motor 43, the auxiliary machines and the like.

The controller 5 then calculates a target value of the cathode pressure during a normal operation (hereinafter, referred to as a "normal target cathode pressure") on the basis of the target output current in a case where it is during the normal operation after the warm-up of the fuel cell stack 1 was completed. The controller 5 controls the cathode compressor 25 so that the cathode pressure becomes the normal target cathode pressure. The normal target cathode pressure is a cathode pressure required to ensure an oxygen partial pressure, which is necessary for electrode reactions within the cathode electrode of each of the fuel cells when the target output current is extracted from the fuel cell stack 1 after the warm-up is completed.

On the other hand, if it is during the warm-up of the fuel cell stack 1, the controller 5 basically sets up the target value of the cathode pressure to a predetermined warm-up acceleration target cathode pressure higher than the normal target cathode pressure. The controller 5 then controls the cathode compressor 25 so that the cathode pressure becomes the warm-up acceleration target cathode pressure. The warm-up acceleration target cathode pressure is set up to a pressure as high as possible while taking into account deterioration of sound vibration performance due to noise or vibration generated by driving the cathode compressor 25.

This causes electricity consumption of the cathode compressor 25, which is one of the auxiliary machines, to become larger compared with that during the normal operation. By increasing the generated electric power of the fuel cell stack 1, the warm-up of the fuel cell stack 1 is accelerated by means of self-heating.

Thus, electricity consumption of the cathode compressor 25, the cooling water heater (not shown in the drawings) and the like is increased as large as possible during the warm-up of the fuel cell stack 1, whereby the warm-up of the fuel cell stack 1 is accelerated.

Figure 2:
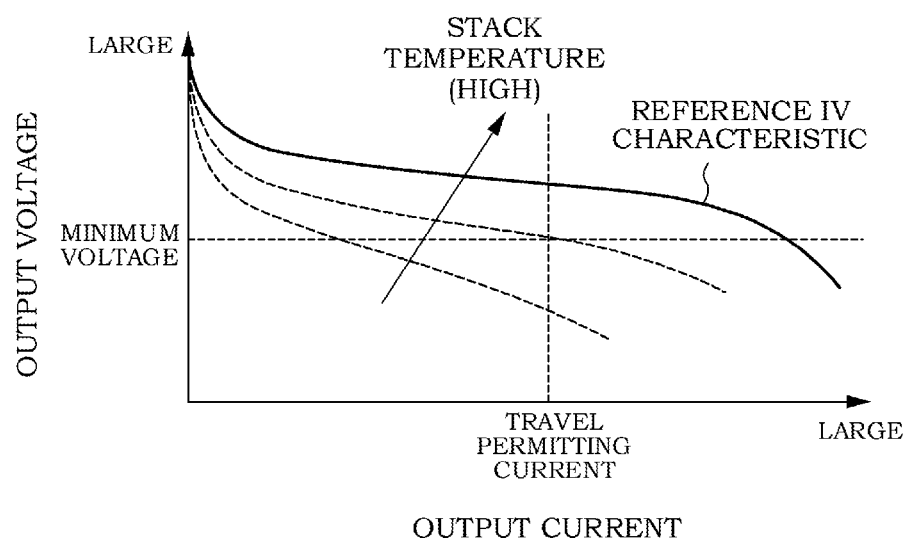
FIG. 2 is a view showing a relationship between a stack temperature and an IV characteristic of a fuel cell stack.

Further, as shown in FIG. 2, an IV characteristic of the fuel cell stack 1 varies in accordance with the stack temperature (the average temperature of the inlet water temperature and the outlet water temperature). The lower the stack temperature is, the lower the output voltage is when the output current with the same current value is extracted from the fuel cell stack 1. Namely, the lower the stack temperature is, the greater a power generation efficiency of the fuel cell stack 1 drops. FIG. 2 is a view showing a relationship between the stack temperature and the IV characteristic of the fuel cell stack 1. An IV characteristic indicated by a solid line is an IV characteristic (hereinafter, referred to as a "reference IV characteristic") after the warm-up of the fuel cell stack 1 is completed, that is, the IV characteristic during the normal operation.

In a case where traveling of the vehicle is permitted in a state where the power generation efficiency of the fuel cell stack 1 drops, there is a fear that the output voltage of the fuel cell stack 1 falls below the minimum voltage when an electric power of the drive motor 43 required while traveling becomes larger and the output current of the fuel cell stack 1 is increased. Here, the minimum voltage is a voltage value set up on the basis of the minimum voltage for operation guarantee and/or the minimum voltage for performance guarantee that components connected to the fuel cell stack 1 inherently have. Further, the minimum voltage is a voltage value in which the drive motor 43 cannot be driven in a case where the output voltage of the fuel cell stack 1 falls below this voltage value.

For that reason, after starting up the fuel cell system 100, the controller 5 estimates the IV characteristic of the fuel cell stack 1, which varies from moment to moment, while warming up the fuel cell stack 1, and outputs traveling permission for the vehicle at the time when the estimated IV characteristic becomes the IV characteristic in which the output voltage of the fuel cell stack 1 does not fall below the minimum voltage even though the drive motor 43 is driven. Referring to FIG. 2, the controller 5 confirms that the IV characteristic is established in which the output voltage when the output current of the fuel cell stack 1 becomes a travel permitting current does not fall below the minimum voltage, and then outputs the traveling permission for the vehicle. In this regard, in the present invention, the IV characteristic is estimated on the basis of the output voltage detected while changing the output current of the fuel cell stack 1 as well as the conventional one. However, the estimating method is not limited to this method.

Here, during the warm-up in which the IV characteristic of the fuel cell stack 1 is not recovered to the reference IV characteristic, an upper limit of the generated electric power (hereinafter, referred to as the "maximum generated electric power") of the fuel cell stack 1 becomes smaller than that during the normal operation.

For that reason, when the traveling permission is outputted during the warm-up and an acceleration request by a driver is generated, the drive motor 43 has to be driven in a state where the maximum generated electric power is smaller than that during the normal operation. As a result, in order to ensure operability in the generated electric power thus restricted, there is a possibility that electricity consumption of the cathode compressor 25, which was increased for warm-up acceleration, has to be reduced to supply an electric power required by the drive motor 43 (hereinafter, referred to as a "drive motor required electric power") to the drive motor 43. In other words, there is a possibility that the target value of the cathode pressure during the warm-up has to be reduced compared with the warm-up acceleration target cathode pressure.

In this case, it is thought that the cathode pressure during the warm-up drops to a pressure that meets the target output current, that is, the normal target cathode pressure. However, it was found that the following problem occurred by doing in this manner.

The IV characteristic of the fuel cell stack 1 may vary depending on the cathode pressure in addition to the stack temperature. In particular, its influence is larger during the warm-up in which power generation is unstable. More specifically, in a case where the cathode pressure is higher but the stack temperature is the same, the oxygen partial pressure within the cathode electrode becomes higher. Thus, the IV characteristic tends to become better.

Here, the traveling permission is outputted in a state where the cathode pressure is controlled to the warm-up acceleration target cathode pressure. For that reason, when the cathode pressure is caused to drop to the normal target cathode pressure from the warm-up acceleration target cathode pressure during the warm-up after the traveling permission was outputted, for example, and the cathode pressure is excessively lowered, the IV characteristic deteriorates due to dropping of the oxygen partial pressure within the cathode electrode. As a result, there is a fear that the current IV characteristic deteriorates compared with the IV characteristic when the traveling permission was outputted. Thus, there is a fear that the output voltage of the fuel cell stack 1 falls below the minimum voltage by means of driving of the drive motor 43.

For that reason, in the present embodiment, even in a case where the traveling permission is outputted during the warm-up and there is an acceleration request, deterioration of the IV characteristic is suppressed. More specifically, in a case where the traveling permission is outputted during the warm-up and there is an acceleration request, the cathode pressure is controlled so that the IV characteristic at least does not fall below the IV characteristic when the traveling permission was outputted. Hereinafter, the cathode pressure control according to the present embodiment will be described.

Figure 3:
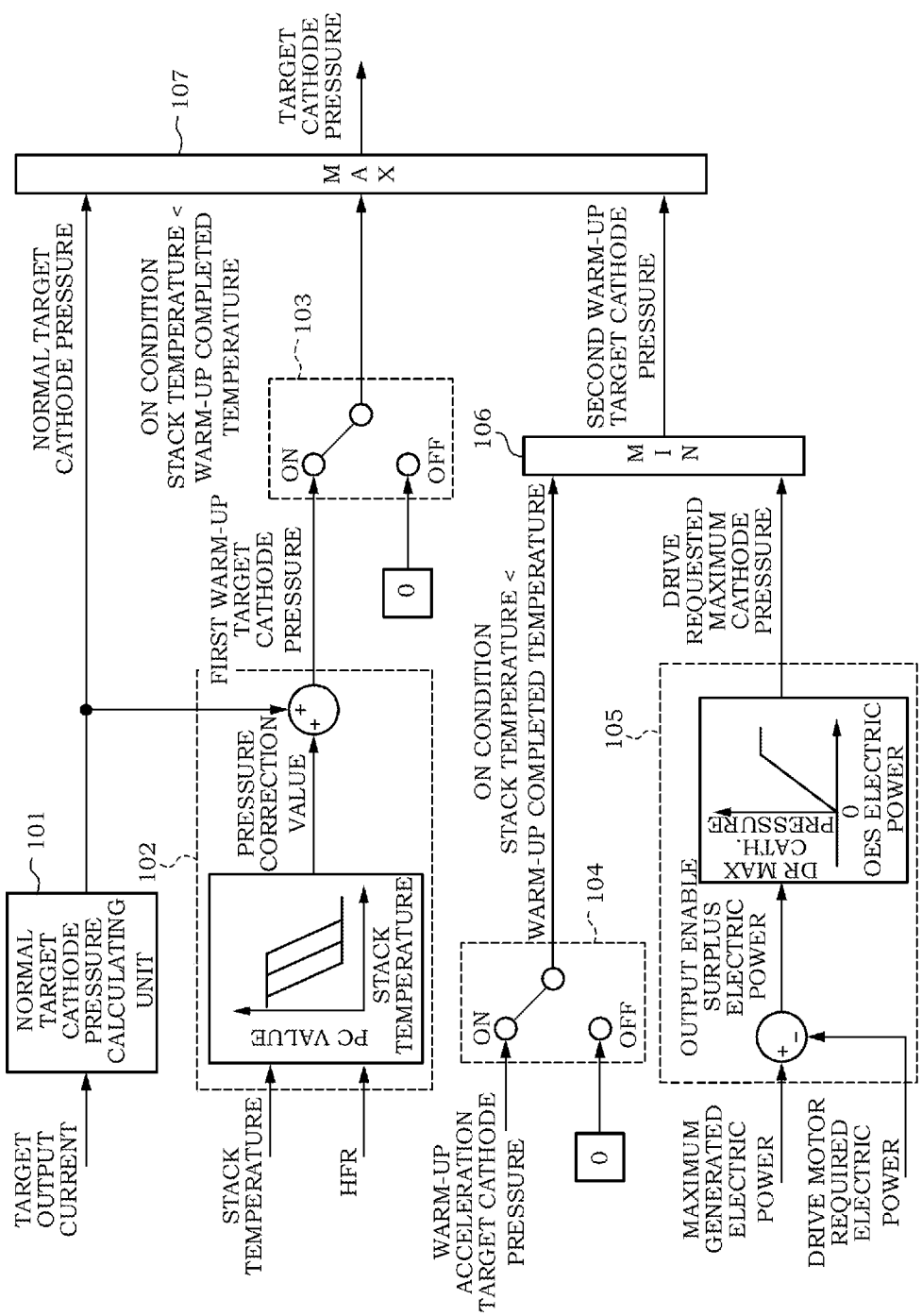
FIG. 3 is a block diagram for explaining a cathode pressure control according to one embodiment of the present invention.

FIG. 3 is a block diagram for explaining the cathode pressure control according to the present embodiment. In this regard, a normal target cathode pressure calculating unit 101, a first warm-up target cathode pressure calculating unit 102, a drive requested maximum cathode pressure calculating unit 105, a second warm-up target cathode pressure calculating unit 106, and a target cathode pressure setting unit 107 (will be described below) are constructed by hardware such as a CPU of the controller 5 and predetermined programs stored in the ROM and the like, for example.

The target output current is inputted to the normal target cathode pressure calculating unit 101. The normal target cathode pressure calculating unit 101 calculates a normal target cathode pressure on the basis of the target output current. The normal target cathode pressure becomes higher when the target output current is larger compared with when the target output current is smaller.

The normal target cathode pressure, the stack temperature, and an internal high-frequency resistance of the fuel cell stack 1 (High Frequency Resistance; hereinafter, referred to as an "HFR") are inputted to the first warm-up target cathode pressure calculating unit 102. There is a correlation between humidity (water content) of the electrolyte membrane and the HFR. The HFR may be calculated by a known AC impedance method, for example.

Figure 4:
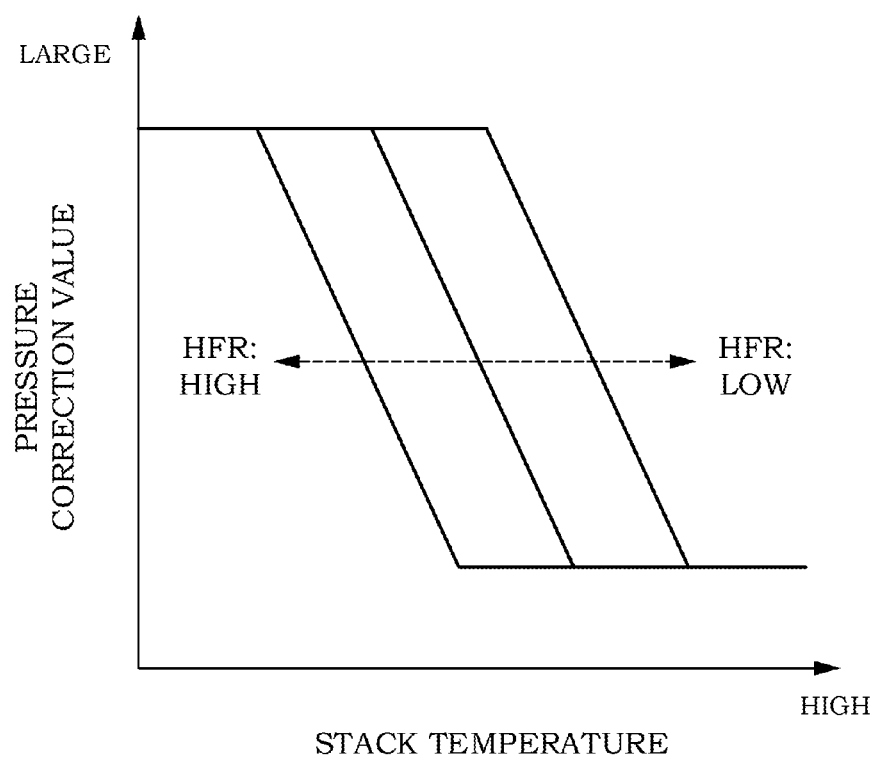
FIG. 4 is a map for calculating a pressure correction value on the basis of the stack temperature and an HFR.

The first warm-up target cathode pressure calculating unit 102 first refers to a map of FIG. 4, and calculates a pressure correction value on the basis of the stack temperature and the HFR. Next, the first warm-up target cathode pressure calculating unit 102 calculates a first warm-up target cathode pressure by adding the pressure correction value to the normal target cathode pressure. The first warm-up target cathode pressure is a lower limit value of the cathode pressure that is at least required so that the IV characteristic does no fall below the IV characteristic when the traveling permission is outputted.

The stack temperature becomes lower during the warm-up than that during the normal operation, and it is in a state that it is hard to take out liquid water from the inside of the fuel cell stack 1. Thus, the amount of the liquid water that exists within the fuel cell stack 1 becomes larger compared with that during the normal operation. For that reason, there is a fear that in a case where the cathode pressure is controlled to the normal target cathode pressure during the warm-up, the hydrogen cannot spread to the cathode electrode sufficiently due to an influence of the liquid water and the IV characteristic thereby deteriorates.

Thus, in the present embodiment, by setting up the first warm-up target cathode pressure as the lower limit value of the cathode pressure during the warm-up, such deterioration of the IV characteristic is suppressed. For that reason, as shown in a map of FIG. 4, the pressure correction value is set up to become larger when the stack temperature and the HFR are lower compared with a case where they are higher. This is because the amount of liquid water within the cathode electrode becomes greater as the stack temperature and the HFR are lower. Unless the cathode pressure is set up to become higher so that the oxygen partial pressure within the cathode electrode becomes higher, the hydrogen cannot spread to the cathode electrode sufficiently due to the influence of the liquid water.

The first warm-up target cathode pressure and a fixed value are inputted to a first switching unit 103. When the stack temperature is lower than a predetermined warm-up completed temperature (for example, 60° C.), the first switching unit 103 outputs the first warm-up target cathode pressure. On the other hand, when the stack temperature is equal to or higher than the warm-up completed temperature, the first switching unit 103 outputs a fixed value. This fixed value is a value smaller than the minimum value of the normal target cathode pressure. In the present embodiment, the fixed value is set up to zero.

The warm-up acceleration target cathode pressure and the fixed value are inputted into a second switching unit 104. The second switching unit 104 outputs the warm-up acceleration target cathode pressure when the stack temperature is lower than the warm-up completed temperature. On the other hand, the second switching unit 104 outputs a fixed value when the stack temperature is equal to or higher than the warm-up completed temperature. This fixed value is also a value smaller than the minimum value of the normal target cathode pressure. In the present embodiment, the fixed value is set up to zero.

The maximum generated electric power of the fuel cell stack 1 at the present moment and the drive motor required electric power that varies in accordance with the accelerator operating amount are inputted into the drive requested maximum cathode pressure calculating unit 105. In the present invention, the maximum generated electric power during the warm-up is calculated in accordance with the stack temperature. More specifically, the maximum generated electric power is set up so that the higher the stack temperature becomes, the greater the maximum generated electric power becomes.

The drive requested maximum cathode pressure calculating unit 105 first subtracts the drive motor required electric power from the maximum generated electric power to calculate a surplus electric power of the fuel cell stack 1 that can output (hereinafter, referred to as an "output enable surplus electric power"). Next, the drive requested maximum cathode pressure calculating unit 105 refers to a table of FIG. 5, and calculates a drive requested maximum cathode pressure on the basis of the output enable surplus electric power.

Figure 5:
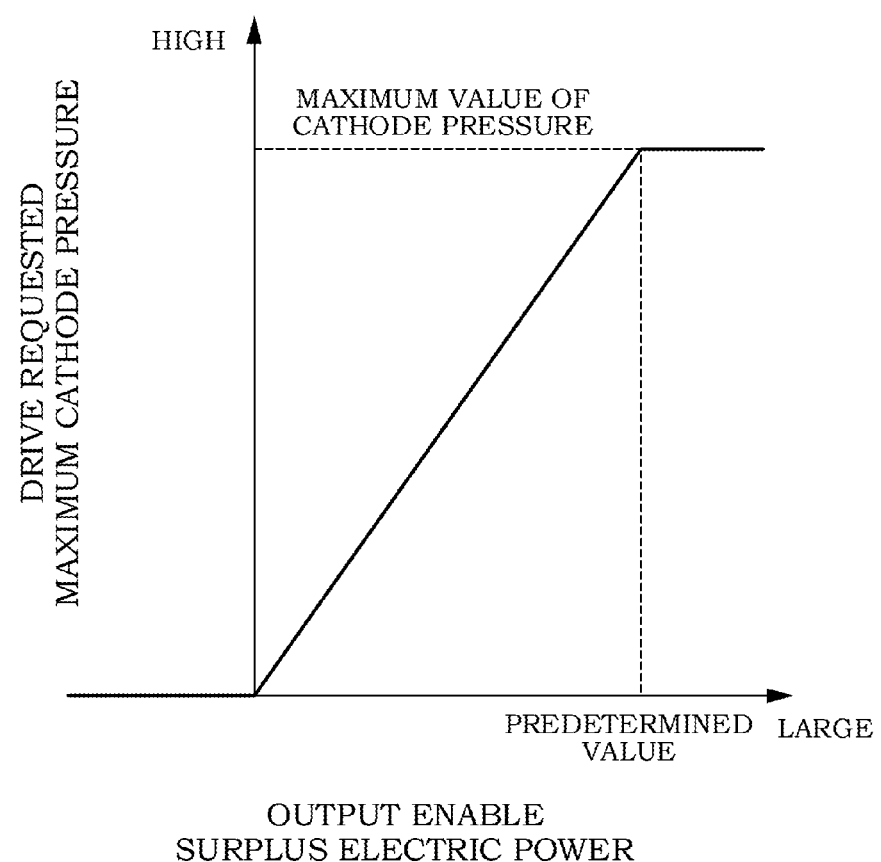
FIG. 5 is a table for calculating a drive requested maximum cathode pressure on the basis of an output enable surplus electric power.

In a case where it is thought that the cathode compressor 25 is driven by the output enable surplus electric power, the drive requested maximum cathode pressure is the maximum value that can be set up as the target value of the cathode pressure. For that reason, when the output enable surplus electric power becomes a predetermined value or higher as shown in the table of FIG. 5, the drive requested maximum cathode pressure is set up to the maximum value of the cathode pressure, which is set up in advance from a point of view of pressure resistance of each component of a cathode system including the fuel cell stack 1.

An output value from the second switching unit 104 (the warm-up acceleration target cathode pressure or the fixed value) and the drive requested maximum cathode pressure are inputted into the second warm-up target cathode pressure calculating unit 106. The second warm-up target cathode pressure calculating unit 106 calculates smaller one of these two input values as the second warm-up target cathode pressure.

The normal target cathode pressure, the first warm-up target cathode pressure, and the second warm-up target cathode pressure are inputted into the target cathode pressure setting unit 107. The target cathode pressure setting unit 107 sets up the largest one of these three input values as the target cathode pressure. Then, the cathode compressor 25 (and the cathode pressure regulating valve 28) is controlled so that the cathode pressure becomes this target cathode pressure.

If it is during the normal operation after the warm-up of the fuel cell stack 1 is completed, the fixed value "zero" is inputted into the target cathode pressure setting unit 107 as each of the first warm-up target cathode pressure and the second warm-up target cathode pressure. For that reason, during the normal operation after the warm-up of the fuel cell stack 1 is completed, the normal target cathode pressure is set up as the target cathode pressure.

On the other hand, higher one of the first warm-up target cathode pressure and the second warm-up target cathode pressure is set up as the target cathode pressure during the warm-up.

Figure 6:
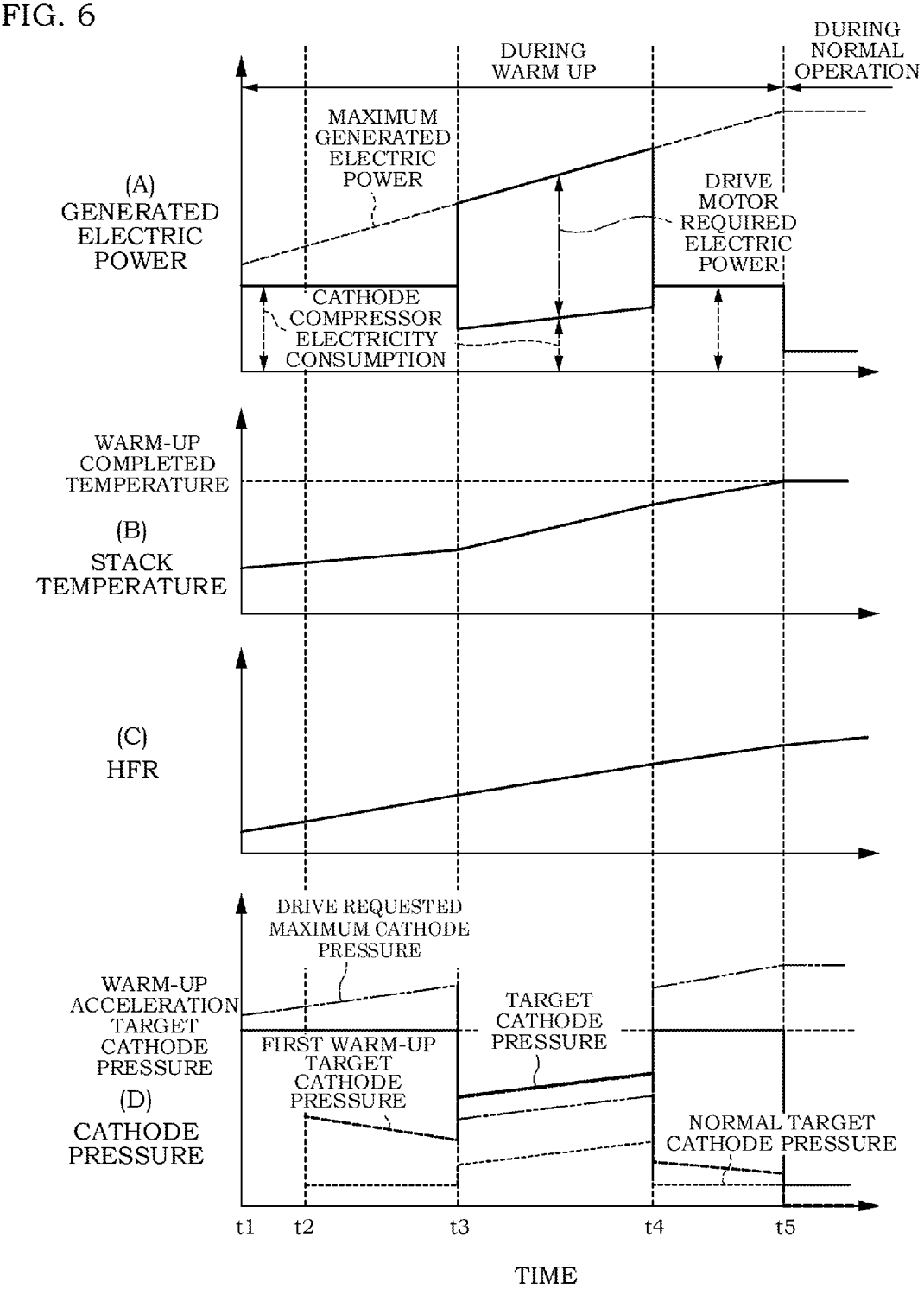
FIG. 6 is a time chart for explaining an operation of a cathode pressure control according to one embodiment of the present invention.

FIG. 6 is a time chart for explaining an operation of the cathode pressure control according to the present embodiment.

When the fuel cell system 100 is started up at a time t1, a warm-up operation is carried out until a time t5 at which the stack temperature becomes the warm-up completed temperature (FIG. 6(B)). Then, in the early period of the warm-up before the traveling permission is outputted, the warm-up acceleration target cathode pressure (the second warm-up target cathode pressure) is set up as the target cathode pressure in order to accelerate the warm-up of the fuel cell stack 1 (FIG. 6(D)).

By carrying out the warm-up operation, the IV characteristic of the fuel cell stack 1 is gradually recovered toward the reference IV characteristic, and the maximum generated electric power is gradually increased in accordance with the recovery (FIG. 6(A)).

When the IV characteristic of the fuel cell stack 1 becomes the IV characteristic in which the output voltage of the fuel cell stack 1 does not fall below the minimum voltage even though the drive motor 43 is driven at a time t2, traveling permission is outputted. After outputting the traveling permission, the warm-up acceleration target cathode pressure (the second warm-up target cathode pressure) also continues to be set up as the target cathode pressure at a time t3 at which an acceleration request by the driver is generated (FIG. 6(D)).

At the time t3, when the acceleration request by the driver is generated to generate the drive motor required electric power (FIG. 6(A)) and the output enable surplus electric power drops, the drive requested maximum cathode pressure also drops in accordance with this dropping (FIG. 6(D)). As a result, the drive requested maximum cathode pressure becomes lower than the warm-up acceleration target cathode pressure, and the drive requested maximum cathode pressure is set up as the second warm-up target cathode pressure.

On the other hand, when the acceleration request by the driver is generated and the drive motor required electric power is generated, the target output current increases to that extent. Therefore, the first warm-up target cathode pressure increases (FIG. 6(D)).

Here, the first warm-up target cathode pressure becomes higher than the drive requested maximum cathode pressure (the second warm-up target cathode pressure) from the time t3 to a time t4 at which there is no acceleration request by the driver. Thus, the first warm-up target cathode pressure is set up as the target cathode pressure (FIG. 6(D)). In this regard, an insufficient electric power when the target cathode pressure is set up to a pressure higher than the drive requested maximum cathode pressure is compensated (or provided) by an electric power of the battery 45.

Thus, when there is a request to drive the drive motor 43 during the warm-up, the cathode pressure is controlled so as not to fall below the first warm-up target cathode pressure. This makes it possible to cause the IV characteristic not to fall below at least the IV characteristic when the traveling permission was outputted.

When there is no acceleration request by the driver at the time t4, the drive requested maximum cathode pressure becomes higher in accordance with an increase in the output enable surplus electric power. As a result, the warm-up acceleration target cathode pressure becomes higher than the drive requested maximum cathode pressure again, and the warm-up acceleration target cathode pressure is thus set up as the second warm-up target cathode pressure (FIG. 6(D)).

On the other hand, the first warm-up target cathode pressure drops depending on dropping of the target output current. As a result, the warm-up acceleration target cathode pressure (the second warm-up target cathode pressure) becomes higher than the first warm-up target cathode pressure, and the warm-up acceleration target cathode pressure is thus set up as the target cathode pressure (FIG. 6(D)).

When the stack temperature becomes the warm-up completed temperature at the time t5, the warm-up operation is terminated and the normal operation is carried out, in which the normal target cathode pressure is set up as the target cathode pressure (FIG. 6(D)).

The fuel cell system 100 according to the present embodiment as explained above generates an electric power by supplying the anode gas and the cathode gas to the fuel cell stack 1 as a fuel cell, and includes the auxiliary machines and the drive motor 43 driven by the generated electric power of the fuel cell stack 1. Further, the fuel cell system 100 includes the normal target cathode pressure calculating unit 101 and the target cathode pressure setting unit 107 as a pressure control unit configured to control the pressure of the cathode gas to be supplied to the fuel cell stack 1 to a normal target pressure (the normal target cathode pressure) in order to ensure the oxygen partial pressure within the fuel cell stack 1 in accordance with the generated electric power of the fuel cell stack 1. Moreover, the fuel cell system 100 also includes the first warm-up target cathode pressure calculating unit 102, the first switching unit 103, the second switching unit 104, the drive requested maximum cathode pressure calculating unit 105, the second warm-up target cathode pressure calculating unit 106, and the target cathode pressure setting unit 107 as a warming-up pressure control unit configured to control, during the warm-up of the fuel cell stack 1, the pressure of the cathode gas to be supplied to the fuel cell stack 1 to a predetermined warm-up acceleration target pressure (the second warm-up target cathode pressure) higher than the normal target pressure.

Further, when there is a request to drive the drive motor 43 during the warm-up of the fuel cell stack 1, this warming-up pressure control unit controls the pressure of the cathode gas to be supplied to the fuel cell stack 1 to a warm-up target pressure (the first warm-up target cathode pressure) between the normal target pressure and the warm-up acceleration target pressure.

According to this configuration, the cathode pressure is basically controlled to the predetermined warm-up acceleration target cathode pressure during the warm-up of the fuel cell stack 1. Thus, by increasing electricity consumption of the cathode compressor 25 compared with that during the normal operation to increase the generated electric power of the fuel cell stack 1, the warm-up of the fuel cell stack 1 is accelerated due to self-heating.

Here, the maximum generated electric power is smaller during the warm-up than that during the normal operation. Thus, in a case where the traveling permission is outputted during the warm-up and there is a request to drive the drive motor 43, it is need to supply the drive motor required electric power to the drive motor 43 to ensure operation performance thereof. For that reason, there is a possibility that the cathode pressure is set up to become lower than the warm-up acceleration target cathode pressure so that electricity consumption of the cathode compressor 25 is lowered.

However, since the stack temperature is lower during the warm-up than that during the normal operation and it is in a state where the liquid water is hardly taken out from the inside of the fuel cell stack 1, the amount of liquid water that exists in the fuel cell stack 1 becomes greater compared with that during the normal operation. For that reason, there is a fear that in a case where the cathode pressure is caused to drop from the warm-up acceleration target cathode pressure to the normal target cathode pressure, for example, the cathode pressure is excessively lowered, the hydrogen cannot spread to the cathode electrode sufficiently due to an influence of the liquid water and the IV characteristic thereby deteriorates. In such a case, there is a fear that the current IV characteristic deteriorates compared with the IV characteristic when the traveling permission was outputted and the output voltage of the fuel cell stack 1 falls below the minimum voltage when the drive motor required electric power is supplied to the drive motor 43.

For that reason, as described above, in a case where there is a request to drive the drive motor 43 during the warm-up, the cathode pressure is controlled to the pressure between the warm-up acceleration target cathode pressure and the normal target cathode pressure. This makes it possible to suppress deterioration of the IV characteristic compared with a case where the cathode pressure is caused to drop from the warm-up acceleration target cathode pressure to the normal target cathode pressure. Therefore, it is possible to suppress the current IV characteristic from deteriorating compared with the IV characteristic when the traveling permission was outputted.

In particular, in the present embodiment, the warming-up pressure control unit described above includes, as the warm-up target pressure calculating unit, the first warm-up target cathode pressure calculating unit 102 that calculates the warm-up target pressure (the first warm-up target cathode pressure) by adding a correction value (the pressure correction value) to the normal target pressure. The greater the amount of moisture within the fuel cell stack 1 is, the larger the correction value is set up.

As described above, the first warm-up target cathode pressure is a pressure obtained by adding the pressure correction value to the normal target cathode pressure. The pressure correction value is calculated on the basis of the stack temperature and the HFR. The pressure correction value becomes larger as the amount of liquid water within the fuel cell stack 1 is greater during the warm-up. Therefore, by controlling the cathode pressure to the first warm-up target cathode pressure when there is a drive request for the drive motor 43 during the warm-up, it is possible to supply the hydrogen to the cathode electrode even during the warm-up in which the amount of the liquid water becomes larger than that during the normal operation. Therefore, it is possible to surely suppress deterioration of the IV characteristic.

Moreover, in the present invention, the first warm-up target cathode pressure calculating unit 102 as the warm-up target pressure calculating unit determines that the amount of moisture within the fuel cell stack 1 is larger as the temperature of the fuel cell stack 1 is lower. Further, the first warm-up target cathode pressure calculating unit 102 determines that the amount of moisture within the fuel cell stack 1 is larger as the HFR of the fuel cell stack 1 is smaller.

According to this configuration, as described above, when the amount of moisture is larger, the pressure correction value is set up to become larger. For that reason, in a case where it is determined that the amount of liquid water within the cathode electrode is large when the stack temperature and the HFR are low, the pressure correction value becomes larger in accordance with this. Therefore, it is possible to increase the cathode pressure more accurately, and this makes it possible to heighten the oxygen partial pressure within the cathode electrode. As a result, it is possible to cause the hydrogen to spread to the cathode electrode sufficiently even though the liquid water is affected thereon.

Further, the fuel cell system 100 according to the present embodiment includes: means for calculating the maximum generated electric power of the fuel cell stack 1 during the warm-up on the basis of the temperature of the fuel cell stack 1; means for calculating the surplus electric power of the fuel cell stack 1 (the output enable surplus electric power) on the basis of the maximum generated electric power and the electric power required by the drive motor 43, the surplus electric power being able to be supplied to components other than the drive motor 43; and the drive requested maximum cathode pressure calculating unit 105 as means for calculating the maximum target pressure (the drive requested maximum cathode pressure) of the cathode gas, which can be set up when the drive motor is driven during the warm-up, on the basis of the output enable surplus electric power.

Further, when the drive requested maximum cathode pressure is higher than the first warm-up target cathode pressure, the warming-up pressure control unit controls the pressure of the cathode gas to be supplied to the fuel cell stack 1 to the drive requested maximum cathode pressure. This makes it possible to increase electricity consumption of the cathode compressor 25 to the maximum during the warm-up while driving the drive motor 43 by means of the generated electric power of the fuel cell stack 1. For that reason, it is possible to accelerate the warm-up of the fuel cell stack 1 by means of the self-heating.

As described above, although the embodiments of the present invention have been explained, the above embodiments merely illustrate a part of examples of application of the present invention, and it does not mean that a technical scope of the present invention is limited to a specific configuration of each of the embodiments described above.

For example, in the embodiment described above, the cathode pressure regulating valve 28 is provided. However, this may be replaced by a throttle unit such as an orifice.

Further, in the embodiment described above, a buffer tank as a space for storing the anode-off gas may be provided on the anode gas discharge passage 34, or an internal manifold of the fuel cell stack 1 may be used as a space in place of the buffer tank. In this regard, the internal manifold mentioned herein is a space inside the fuel cell stack 1 in which the anode-off gas that finishes flowing in an anode gas channel within each of the fuel cells is collected. The anode-off gas is then discharged to the anode gas discharge passage 34 via the manifold.

The present application claims priority based on Japanese Patent Application No. 2013-206513, filed with the Japan Patent Office on Oct. 1, 2013, the entire content of which is expressly incorporated herein by reference.

The invention claimed is:

1. A fuel cell system configured to generate an electric power by supplying an anode gas and a cathode gas to a fuel cell, the fuel cell system comprising:
   auxiliary machines and a drive motor driven by the generated electric power of the fuel cell; and
   a controller programmed to:
   control a pressure of the cathode gas to be supplied to the fuel cell at a normal target pressure, the normal target pressure being used for ensuring an oxygen partial pressure within the fuel cell in accordance with the generated electric power of the fuel cell; and
   control the pressure of the cathode gas to be supplied to the fuel cell to become a predetermined warm-up acceleration target pressure during warm-up of the fuel cell, the predetermined warm-up acceleration target pressure being higher than the normal target pressure,
   wherein, the controller is further programmed to control, in a case where there is a request to drive the drive motor during the warm-up of the fuel cell, the pressure of the cathode gas to be supplied to the fuel cell to a warm-up target pressure between the normal target pressure and the warm-up acceleration target pressure.

2. The fuel cell system according to claim 1,
   wherein the controller is further programmed to calculate the warm-up target pressure by adding a correction value to the normal target pressure, and
   wherein the controller is further programmed to determine that the correction value is set up to become larger as an amount of moisture within the fuel cell is larger.

3. The fuel cell system according to claim 2,
   wherein the controller is further programmed to determine that the amount of moisture within the fuel cell is larger as temperature of the fuel cell is lower.

4. The fuel cell system according to claim 2,
   wherein the controller is further programmed to determine that the amount of moisture within the fuel cell is larger as an HFR of the fuel cell is smaller.

5. The fuel cell system according to claim 2,
   Wherein the controller is further programmed to:
   calculate a maximum generated electric power of the fuel cell during the warm-up on the basis of temperature of the fuel cell;
   calculate a surplus electric power of the fuel cell on the basis of the maximum generated electric power and a required electric power of the drive motor; and calculate a maximum target pressure of the cathode gas when the drive motor is driven during the warm-up on the basis of the surplus electric power, wherein the controller is further programmed to control the pressure of the cathode gas to be supplied to the fuel cell so as to become the maximum target pressure when the maximum target pressure is higher than the warm-up target pressure.

6. The fuel cell system according to claim 3,
wherein the controller is further programmed to determine that the amount of moisture within the fuel cell is larger as an HFR of the fuel cell is smaller.

7. The fuel cell system according to claim 3,
wherein the controller is further programmed to:
calculate a maximum generated electric power of the fuel cell during the warm-up on the basis of temperature of the fuel cell;
calculate a surplus electric power of the fuel cell on the basis of the maximum generated electric power and a required electric power of the drive motor; and
calculate a maximum target pressure of the cathode gas when the drive motor is driven during the warm-up on the basis of the surplus electric power, and wherein the controller is further programmed to control the pressure of the cathode gas to be supplied to the fuel cell so as to become the maximum target pressure when the maximum target pressure is higher than the warm-up target pressure.

8. The fuel cell system according to claim 4,
wherein the controller is further programmed to:
calculate a maximum generated electric power of the fuel cell during the warm-up on the basis of temperature of the fuel cell;
calculate a surplus electric power of the fuel cell on the basis of the maximum generated electric power and a required electric power of the drive motor; and
calculate a maximum target pressure of the cathode gas when the drive motor is driven during the warm-up on the basis of the surplus electric power, and wherein the controller is further programmed to control the pressure of the cathode gas to be supplied to the fuel cell so as to become the maximum target pressure when the maximum target pressure is higher than the warm-up target pressure.

\* \* \* \* \*